UNITED STATES PATENT OFFICE.

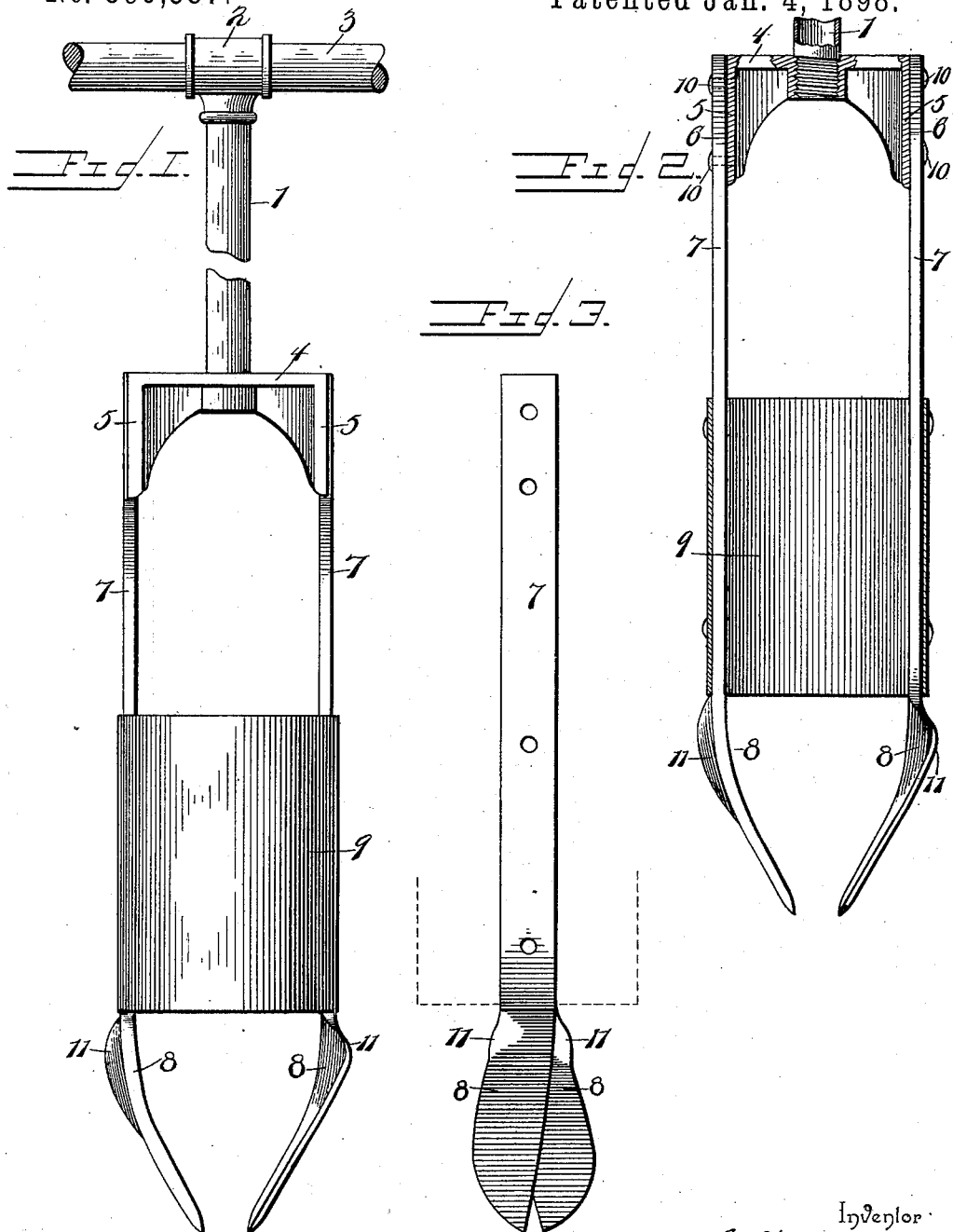

JULIUS A. GREEN, OF SHELBYVILLE, MISSOURI.

POST-HOLE AUGER.

SPECIFICATION forming part of Letters Patent No. 596,587, dated January 4, 1898.

Application filed April 24, 1897. Serial No. 633,759. (No model.)

*To all whom it may concern:*

Be it known that I, JULIUS A. GREEN, a citizen of the United States, residing at Shelbyville, in the county of Shelby and State of Missouri, have invented a new and useful Post-Hole Auger, of which the following is a specification.

My invention relates to post-hole augers, and has for its object to provide a simple, inexpensive, and efficient device adapted to cut and remove earth to form an opening of a size sufficient for a post, the cylinder or receptacle in which the detached core of earth is received being carried by extensions of the blades, which are secured firmly to a cross-head, thus relieving the receptacle or cylinder of strain in operating the cutting-blades and otherwise securing a durability of structure which is essential to the efficiency of devices of this class.

Further objects and advantages of this invention will appear in the following description, and the novel features thereof will be particularly pointed out in the appended claim.

In the drawings, Figure 1 is a side view of an auger constructed in accordance with my invention. Fig. 2 is a vertical sectional view of the cutting-head and cylinder. Fig. 3 is a detail side view of one of the blades, viewing the same from a direction at right angles to the plane of Figs. 1 and 2.

Similar numerals of reference indicate corresponding parts in all the figures of the drawings.

1 designates a shank or staff, preferably of tubular construction, to the upper end of which is secured a T-coupling 2, adapted to receive an operating-handle 3, and threaded upon the lower extremity of the shank or staff is a cross-head 4, provided with vertically-extended terminals 5, having their outer sides channeled to form seats 6 for the reception of the upper ends of blade extensions 7. These blade extensions are constructed integrally with blades 8, and secured to said extensions above the plane of the blades is a cylindrical receptacle 9. The upper extremities of the blade extensions are secured by rivets 10 or equivalent fastening devices in the seats provided at the extremities of the cross-head, and the blades, which incline inwardly toward the axis of the receptacle and are provided with convexed cutting edges, are deflected outwardly, as shown at 11, contiguous to the plane of the lower edge of the receptacle to form clearance for the receptacle and thereby facilitate the withdrawal thereof after a core of earth has been detached and received by the receptacle. The outward bowing of the blades occurs only at the forward or cutting edges thereof, and from the outermost points of the bow the edges of the blades incline slightly forward or in the direction of rotation of the auger and then recede to arrange the points or lower extremities of the blades contiguous to each other.

This peculiar construction of blade enables the auger to cut through a soil containing gravel and small stones with facility, while the arrangement of the points of the blades and their forward inclination in the direction of rotation adapts the device to feed itself and thus relieve the operator of the task of forcing it downwardly into the soil after the boring operation has been commenced.

A further advantage of the construction resides in the fact that the blade extensions are secured directly to the terminals of the cross-head, which is carried by the shank or staff, thereby relieving the receptacle of all strain due to the operation of the device and enabling it to be constructed of sheet metal. Furthermore, the flanged seats in which the extremities of the blade extensions are fitted serve to relieve the fastening devices by which the attachment of said extensions to the cross-head is attained.

Having described my invention, what I claim is—

A post-hole auger comprising a shank or staff provided with means whereby it may be turned, a cross-head secured to the lower extremity of the shank or staff and provided with terminal vertically-elongated flanged seats, cutting-blades having integral parallel vertical blade extensions fitted and secured in said seats, and a cylindrical receptacle secured to and carried by the blade extensions, the blades, which are located below the plane of the lower edge of the receptacle, being inclined downwardly and inwardly toward the axis of rotation of the auger, and having their edges bowed outwardly contiguous to the plane of the lower edge of the receptacle, to form clearance for the latter, and thence inclined forward in the direction of rotation and then rearwardly to the points of the blades, substantially as specified.

In testimony that I claim the foregoing as my own I have hereto affixed my signature in the presence of two witnesses.

JULIUS A. GREEN.

Witnesses:
JAMES H. WOOD,
JNO. D. DALE.